United States Patent
Wanderscheid et al.

(10) Patent No.: US 10,967,923 B2
(45) Date of Patent: Apr. 6, 2021

(54) TRACK WHEEL WITH DECREASED POWER DISSIPATION

(71) Applicant: D & M Enterprises of Sauk Centre, LLP, Sauk Centre, MN (US)

(72) Inventors: Mark Wanderscheid, Sauk Centre, MN (US); David Wanderscheid, Sauk Centre, MN (US)

(73) Assignee: D&M ENTERPRISES OF SAUK CENTRE, LLP, Sauk Centre, MN (US)

( * ) Notice: Subject to any disclaimer, the term of this patent is extended or adjusted under 35 U.S.C. 154(b) by 369 days.

(21) Appl. No.: 15/288,363

(22) Filed: Oct. 7, 2016

(65) Prior Publication Data
US 2018/0099706 A1    Apr. 12, 2018

(51) Int. Cl.
| | | |
|---|---|---|
| *B62D 55/08* | (2006.01) | |
| *B62D 55/10* | (2006.01) | |
| *B62D 55/06* | (2006.01) | |
| *B62D 55/125* | (2006.01) | |
| B62D 55/21 | (2006.01) | |
| B62D 55/30 | (2006.01) | |
| B62M 27/02 | (2006.01) | |

(52) U.S. Cl.
CPC ............ *B62D 55/08* (2013.01); *B62D 55/06* (2013.01); *B62D 55/10* (2013.01); *B62D 55/125* (2013.01); *B62D 55/21* (2013.01); *B62D 55/305* (2013.01); *B62M 27/02* (2013.01); *B62M 2027/027* (2013.01)

(58) Field of Classification Search
CPC .... B62D 55/12; B62D 55/244; B62D 55/125; B62D 55/08; B62D 55/10; B62D 55/06
See application file for complete search history.

(56) References Cited

U.S. PATENT DOCUMENTS

| | | | | |
|---|---|---|---|---|
| 3,120,409 | A * | 2/1964 | Beall | B62D 55/12 305/179 |
| 3,451,728 | A * | 6/1969 | Bruneau | B62D 55/12 305/112 |
| 5,161,867 | A * | 11/1992 | Johnson | B62D 55/125 305/137 |
| 6,250,726 | B1 * | 6/2001 | Burdick | B62D 55/0963 305/123 |
| 6,652,043 | B2 * | 11/2003 | Oertley | B62D 55/0963 305/125 |
| 7,416,266 | B2 * | 8/2008 | Soucy | B62D 55/125 305/174 |
| 8,708,432 | B2 * | 4/2014 | Pard | B62D 55/125 305/174 |
| 8,833,795 | B2 | 9/2014 | Riedl et al. | |
| 8,833,873 | B2 | 9/2014 | Dandurand et al. | |
| 9,308,952 | B2 | 4/2016 | Dandurand et al. | |
| 9,333,997 | B2 | 5/2016 | Hellholm et al. | |

(Continued)

*Primary Examiner* — Scott A Browne
(74) *Attorney, Agent, or Firm* — Patterson Thuente Pedersen, P.A.

(57) ABSTRACT

A vehicle drive system can include wheels that have flat portions corresponding to the areas of relative flexibility of stiffness of a track. When the discontinuous, angular profile of the track of the vehicle can deform about a matching angularly-profiled wheel, a smoother ride with less power loss can be produced, and ratcheting (caused by loosened or mismatched engagement between the track and a driving structure) can be reduced.

2 Claims, 9 Drawing Sheets

(56) References Cited

U.S. PATENT DOCUMENTS

| | | |
|---|---|---|
| 9,346,500 B2 | 5/2016 | Pard |
| 9,409,611 B2 | 8/2016 | Hellholm et al. |
| 9,481,413 B2 | 11/2016 | Pard et al. |
| 2002/0153775 A1* | 10/2002 | Egle ................... B62D 55/125 <br> 305/195 |
| 2003/0111904 A1* | 6/2003 | Cormican ............. B62D 55/12 <br> 305/199 |
| 2003/0141125 A1* | 7/2003 | Wahl ..................... B62M 27/02 <br> 180/191 |
| 2012/0161511 A1* | 6/2012 | Brazier ................. B62D 55/14 <br> 305/178 |
| 2015/0060242 A1* | 3/2015 | Carrara ................. B65G 39/02 <br> 198/834 |
| 2015/0191206 A1* | 7/2015 | Eavenson, Sr. ...... B62D 55/108 <br> 305/199 |

* cited by examiner

TRACK WHEEL WITH DECREASED POWER DISSIPATION

TECHNICAL FIELD

Embodiments described herein relate generally to wheels for track systems such as those used on snowmobiles, tractors, utility vehicles, all-terrain vehicles, skid loaders, excavators, dozers, trail groomers, or other motorized belts, tracks, or pulleys. In embodiments, the track can be tensioned by moving at least one endwheel, such as an idler wheel.

BACKGROUND

Driven tracks are often used in vehicles in which wheels would be inappropriate. For example, tractors or snowmobiles, which are operated on terrain which is unsuitable for wheels, conventionally use driven tracks to move across mud, snow, sand, or other surfaces.

Driven tracks are conventionally made of a flexible material such as rubber, with features that are configured to engage with a drive wheel. For example, a conventional snowmobile track includes a series of inner engagement features (such as drive lugs) that engage with the teeth of a geared drive wheel or sprocket. On the opposite, outer side of the track, there can be a set of lugs, fins, or other features that can dig or scoop into the snow. In operation, the teeth of the drive wheel engage with the inner engagement features to move the track, the radially outer circumference of which propels the snowmobile relative to underlying snow, with additional traction provided by the fins or other outer-edge lug features.

In addition to the drive wheel, most snowmobiles also include idler wheels. These idler wheels can engage with the track and/or with the inner features of the track. In some conventional systems, the spacing between the idler wheel and the drive wheel can be modified, such that the position of the idler wheel can be moved to set a desired level of tension in the track.

Setting the tension level too low can result in "ratcheting," a condition in which the inner engagement features don't full engage with the drive wheel. The drive wheel then spins without providing a corresponding movement in the track. As the teeth or other geared features of the drive wheel spin relative to the track, the periodic impact of the teeth on the inner engagement features causes a sound and feeling of ratcheting.

Ratcheting can be avoided by properly tensioning the track. With sufficient tension on the track holding it in contact with the drive wheel, ratcheting cannot occur. Over time, however, deformation or loosening of the track, or even movement of the idler wheel, can cause looser engagement between the drive wheel and the track. Even a well-tensioned track, therefore, can eventually begin ratcheting if not properly maintained and re-tensioned.

Ratcheting becomes all the more likely with higher-powered snowmobiles. As the level of torque provided to the drive wheel increases, the necessary tension to prevent ratcheting also increases. Tensioning the belt sufficiently to prevent ratcheting in high-powered snowmobiles causes stretching and loosening of the track even faster than in their lower-powered, lower-tension systems. Generally, the trend in snowmobile technology in the past several decades has been to increase power, requiring higher levels of tension to prevent ratcheting.

As described above, ideally to prevent ratcheting the track would be tightened to maintain engagement between the belt and the drive wheel. Arbitrarily increasing the tension on the track brings with it other problems, however.

The main disincentive to increasing the track's tension is that increased tension causes a draw on the power from the drive wheel. A very high tension track can require several horsepower just to run at low speed, as power is dissipated in deforming the band around the contours of the drive wheel, the idler wheel, and any other guides or structures in the path of the track. Therefore, the level of tension has conventionally needed to be maintained between a minimum (below which ratcheting occurs) and a maximum (above which power is unnecessarily dissipated), all while the track itself is loosening, requiring constant minor adjustment to balance these two phenomena.

It should be understood that, while the problems with existing track systems are described above with respect to snowmobiles, these same problems could also occur in other track-driven systems. For example, tractors, drive belts, or pulleys also can exhibit ratcheting, belt stretching, and power loss at high tension.

SUMMARY

According to embodiments, a drive wheel includes a series of flat surfaces or "flats" that can engage with a track. The flat portions more accurately correspond to the discontinuous shape of a track having lugs or other support structures as they wrap around rounded surfaces. By matching this discontinuous profile along the drive wheel or other wheels, power lost stretching the track around a rounded wheel are avoided. This also reduces elastic and inelastic stretching of the track, which permits for increased baseline tension on the track and reduces ratcheting.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Snowmobile tracks are constructed with thick rods at a specific distance apart to give the track stiffness and join multiple individual belts together into one unit. Conventionally, these rods are made from fiberglass or a similar inelastic material. Because these rods are very stiff compared to the track material, and also they are relatively wide (typically up to about 20 mm), they do not conform to a round sprocket or wheel. Another feature that further reduces the ability of the track to conform to a round wheel is the lug molded to the outside of the track. These flat and/or stiff features, when forced around the drive wheel, generate a substantial amount of resistance. Using a drive wheel that includes drive wheels and/or idler wheels as described below reduces the resistance associated with driving the belt, permitting a high level of tension to be applied to the track to prevent ratcheting without large associated power losses.

Figure 1:
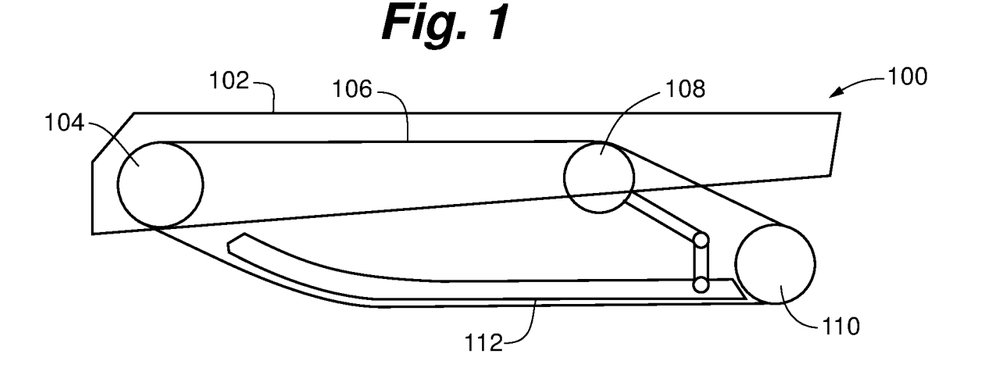
FIG. 1 is a schematic diagram of a vehicle with a track drive system according to an embodiment.

FIG. 1 is a simplified schematic diagram of a vehicle 100. Vehicle 100 is track-driven. Vehicle 100 includes tunnel 102, front wheel 104, track 106, idler wheel 108, back wheel 110, and slide rail 112.

Vehicle 100 can be, for example, a portion of a snowmobile. Some elements of vehicle 100 are omitted in the diagram shown in FIG. 1. For example, vehicle 100 does not depict a motor or engine, seats, steering skis, or other common components of a snowmobile or other similar vehicle. Rather, FIG. 1 depicts certain components associated with a track driving system of vehicle 100 that are prone to ratcheting.

Tunnel 102 is arranged on a top side of vehicle 100, in the orientation shown in FIG. 1. Tunnel 102 or a similar structural component can be positioned on top of the driving system of vehicle 100 to provide a place for an operator to sit, and to support other structural components of vehicle 100 that are not shown in FIG. 1.

Front wheel 104 is a driving wheel, in embodiments. Front wheel 104 can be driven by a motor or engine, to pull track 106. When front wheel 104 engages with track 106 properly, there is no ratcheting or disengagement between those two components. Preferably, power delivered to front wheel 104 corresponds to as much torque and rotational speed of track 106 as possible, minimizing losses due to friction, ratcheting, or elastic deformation of track 106.

Although "front wheel" and "drive wheel" are used synonymously throughout this application, it should be understood that any wheel, no matter where it is located along track 106, could be used as the drive wheel. The front wheel of conventional snowmobiles is used as the driving wheel, but in various other track-driven vehicles, one or more other wheels that are not located at the front position with respect to movement of the vehicle could be used as the drive wheel.

When power is delivered from front wheel 104 to track 106, track 106 will move around the loop defined by idler wheel 108, back wheel 110, and slide rail 112. In various alternative embodiments, there could be more or fewer idler wheels 108. Back wheel 110 is shown as larger than idler wheel 108 in vehicle 100 of FIG. 1, although in alternative embodiments back wheel 110 could be the same size or smaller than idler wheel 108. In alternative embodiments such as tractors, there can be multiple drive wheels, rather than only one driven front wheel 104. Additionally or alternatively, embodiments can include idler wheels 108 in a variety of positions about the loop defined by track 106, including adjacent to slide rail 112, for example.

In the embodiment shown in FIG. 1, rotation of front wheel 104 in a counter-clockwise direction causes track 106 to move along sliderail 112 towards back wheel 110, then around back wheel 110 towards idler wheel 108, and from idler wheel 108 back to front wheel 104. Adjusting the position of back wheel 110, for example, can increase or decrease the tension on track 106.

As shown in FIG. 1, track 106 is not entirely smooth or rounded when passing around front wheel 104 or back wheel 110. This lack of smoothness is caused in tracks or belts by drive teeth that pass through the drive teeth perpendicular to the direction of motion of the track. Each bar adds rigidity, whereas the portions in between the drive teeth are less rigid and allow for relatively more flexure.

Due to this lack of smoothness of track 106 when passing around a curve, in a system in which front wheel 104, idler wheel 108, and/or back wheel 110 are perfectly rounded, as is the case in most conventional systems, elastic deformation of track 106 occurs as it passes around the loop. This elastic deformation causes large energy losses, and limits the transfer of power from a motor or engine of vehicle 100 into movement. Furthermore, sufficient force applied over time can stretch out track 106 permanently, and such inelastic deformation can cause progressive loosening of track 106, and eventually ratcheting will occur. Therefore, because wheels 104, 108, 110 do not match the actual, angular shape of track 106 during its movement, the two previously-described problems of ratcheting and power dissipation can occur.

In contrast, if front wheel 104, idler wheel 108, and/or back wheel 110 are designed to conform to the shape of track 106, including angular portions as track 106 curves about each wheel, then there will be less deformation, less stretching, and correspondingly less ratcheting and power loss.

In sum, matching the discontinuous profile of track 106 as it wraps around a wheel, rather than forcing it to conform to the rounded wheel shape, decreases the variation in stretching required of the track as the various support drive teeth or lugs pass around it. When wheels 104, 108, 110 are rounded, track 106 must stretch and shrink as it passes around them. By matching the profile of the track to the wheels 104, 108, 110, track 106 does not need to stretch and shrink in this way. This not only reduces wear and tear on track 106, it also decreases engine power devoted to deforming track 106, and produces a smoother, less jerky rotational speed of track 106.

Figure 2A:
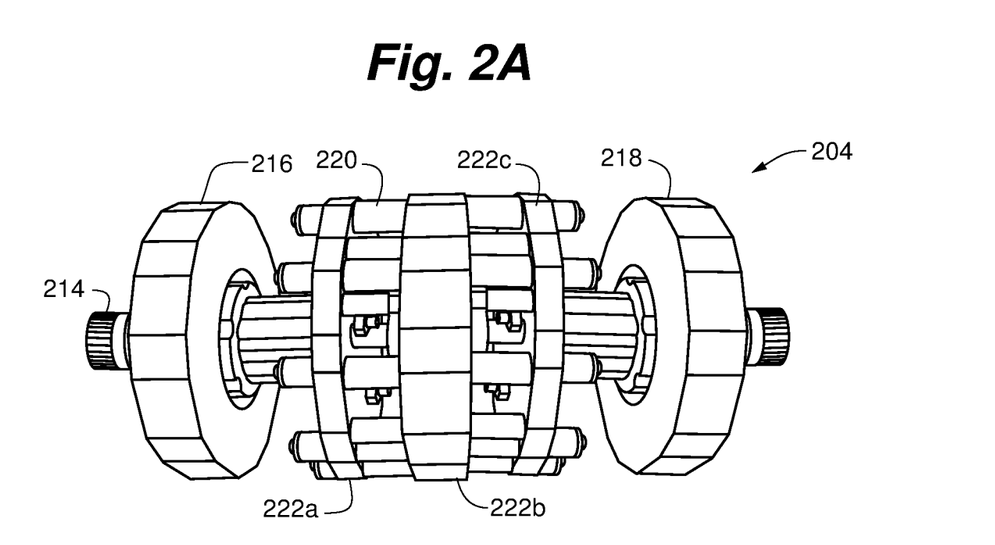
FIG. 2A is a top view of a driveshaft assembly according to an embodiment.

FIG. 2A is a top view of a front driveshaft assembly 204 according to an embodiment. Front driveshaft assembly 204 can be implemented in a track-driven vehicle, such as vehicle 100 previously described with respect to FIG. 1. In general, throughout this application, like numbers iterated by factors of 100 are used to describe like parts. Thus, for example, front driveshaft assembly 204 of FIG. 2A could be used in place of front wheel 104 of FIG. 1.

Figure 2B:
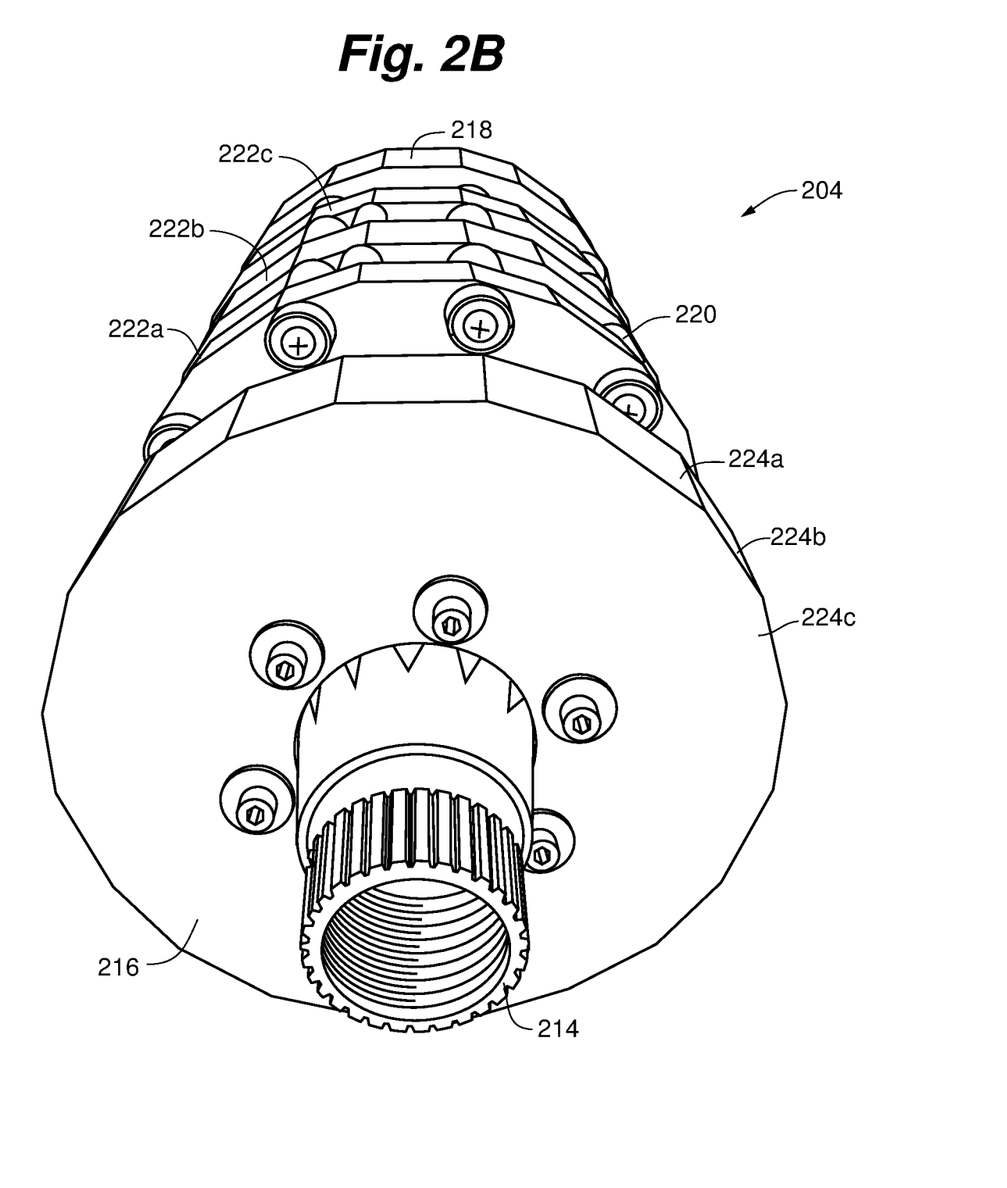
FIGS. 2B and 2C are perspective views of the embodiment of FIG. 2A.
Figure 2C:
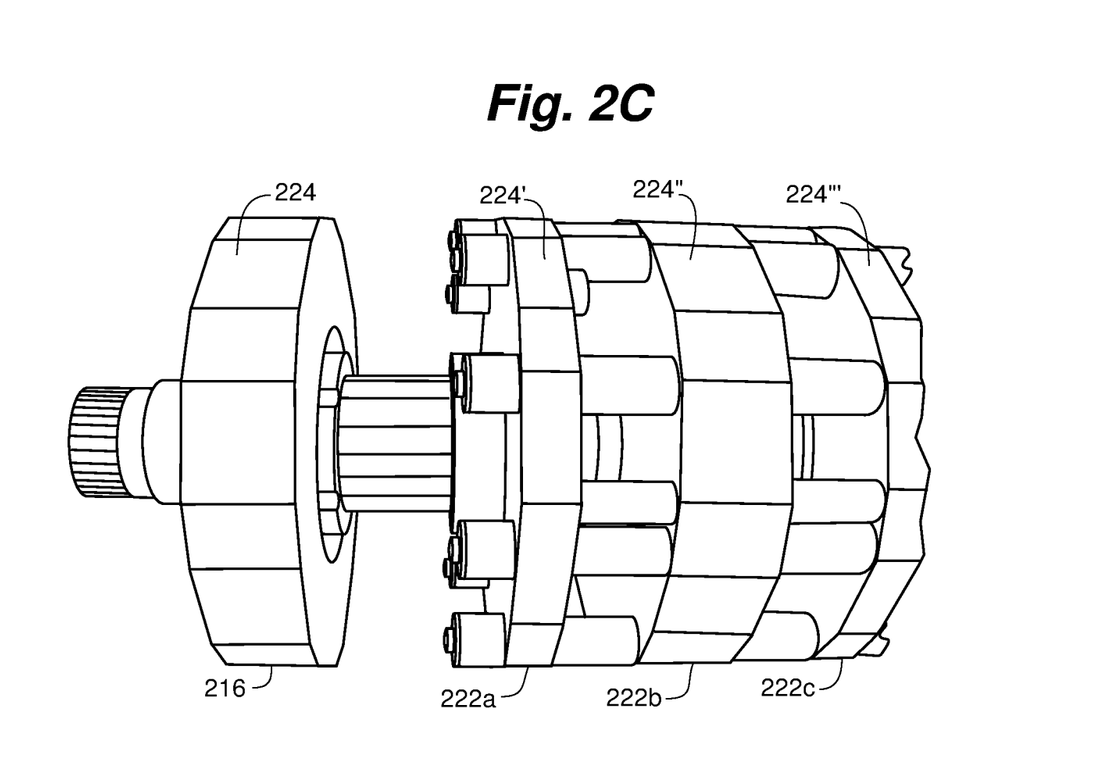

In the embodiment shown in FIG. 2A-2C, front drive assembly 204 includes drive shaft 214, first toothless outer sprocket 216, second toothless outer sprocket 218, drive teeth 220, drive sprockets 222a-222c, and flats 224a-224c.

In alternative embodiments, first and second toothless outer sprockets 216 and 218 can include teeth. The embodiment shown in FIGS. 2A-2C merely depict one embodiment in which the outer sprockets are toothless. In still further embodiments, outer sprockets can be omitted from the front drive assembly altogether. In such embodiments, drive sprockets 222a-222c can be spaced relatively more widely.

Drive shaft 214 is a shaft that can be driven by a belt, counterpart gear, pulley, or other structure, in various embodiments. Drive shaft 214 is mechanically coupled to a motor or engine (not shown) to cause rotation of drive shaft 214. Because drive shaft 214 also forms an axle or driveshaft (see, e.g., driveshaft assembly 326 of FIG. 3) about which the other components of front driveshaft assembly 204 turn, applying torque at drive shaft 214 will cause rotation of front driveshaft assembly 204.

First toothless sprocket 216 and second toothless sprocket 218 are arranged along the central axle defined by drive shaft 214, and both sprockets 216, 218 co-rotate with drive shaft 214. Extending between first toothless sprocket 216 and second toothless sprocket 218 are a series of drive teeth 220, bound together by drive sprockets 222a-222c.

First toothless sprocket 216 and second toothless sprocket 218, as well as drive sprockets 222a-222c, include flats 224a-224c, as shown in FIG. 2B. Each flat can extend across all of the drive sprockets 222a-222c, as well as the sprockets 216, 218. As shown in FIG. 2C, flat 224 of first toothless sprocket 216 can be aligned with flat 224' of first sprocket 222a, flat 224" of second sprocket 222b, and flat 224'" of third sprocket 222c, as well as a corresponding flat of second toothless sprocket 218 (not shown).

In alternative embodiments, more or fewer than 3 sprockets can tie together drive teeth 220. Drive teeth 220 provide rigid support for engagement features (e.g., drive lugs) on a track (e.g., track 106). Drive teeth 220 can therefore comprise solid polymer, metal, or other rigid substances that can mechanically support and drive such features. In various embodiments, the number and position of drive teeth 220 can vary.

Figure 3:
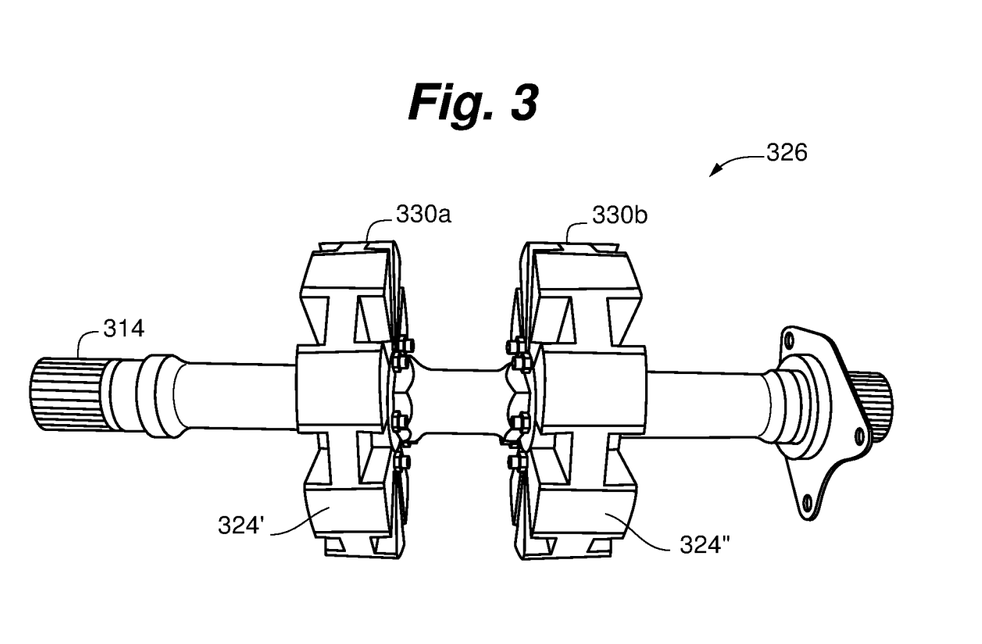
FIG. 3 is a driveshaft assembly according to an embodiment.

FIG. 3 depicts a driveshaft assembly 326 according to an embodiment. Driveshaft assembly 326 includes drive shaft 314, and sprockets 330a, 330b. As described above with respect to FIG. 1, drive shaft 314 is driven to turn sprockets 330a, 330b. In the embodiment shown in FIG. 3, sprockets 330a and 330b do not include any drive teeth. Sprockets 330a and 330b each define a series of flats. Those flats are paired with one another in groups, as shown with respect to flat 324' of sprocket 330a and flat 324" of sprocket 330b. As a belt or track travels around a curve, it will deform to have a series of flat or nearly-flat portions tangential to the curve. Each such flat or nearly-flat portion rests on one such group of paired flats.

In one embodiment, drive sprockets 330a and 330b include machined notches. The machined notches within drive sprockets 330a and 330b are configured to engage the track drive lugs to the wheel. The portion of drive sprockets 330a and 330b that has not been machined away function effectively as the drive teeth, extending radially outward to grip the track and prevent ratcheting. The embodiments shown in FIGS. 2A and 3 both drive the track, according to two different embodiments to make the a part. The embodiment shown in FIG. 3 is less complex than that depicted in FIG. 2A, and is therefore ideal for use in a production snowmobile, for example.

Figure 4:
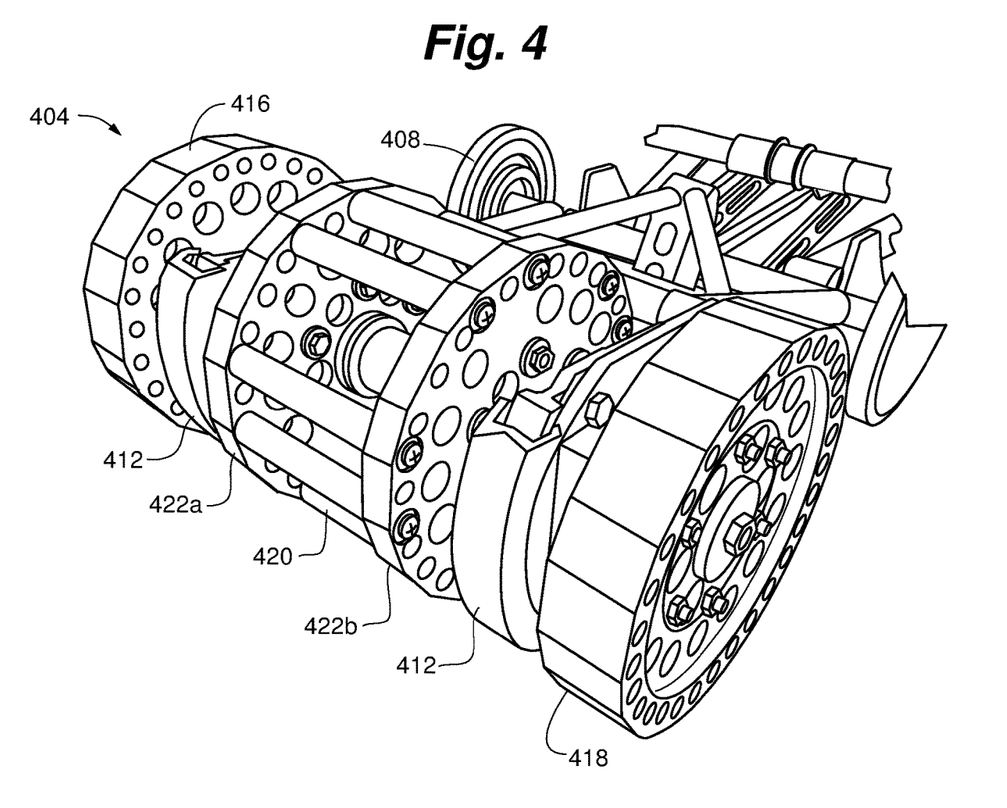
FIG. 4 is an idler assembly according to an embodiment.

FIG. 4 is a perspective view of tensioning idler wheel assembly 404, coupled to idler wheel 408 and slide rail 412. Tensioning idler wheel assembly 404 includes first toothless outer sprocket 416, second toothless outer sprocket 418, and timing roller 420. These components are coupled together by drive sprockets 422a, 422b, in the embodiment shown in FIG. 4. Each of the toothless outer sprockets 416, 418, as well as drive sprockets 422a and 422b, have angular outer circumferences (i.e., flats).

Figure 6:
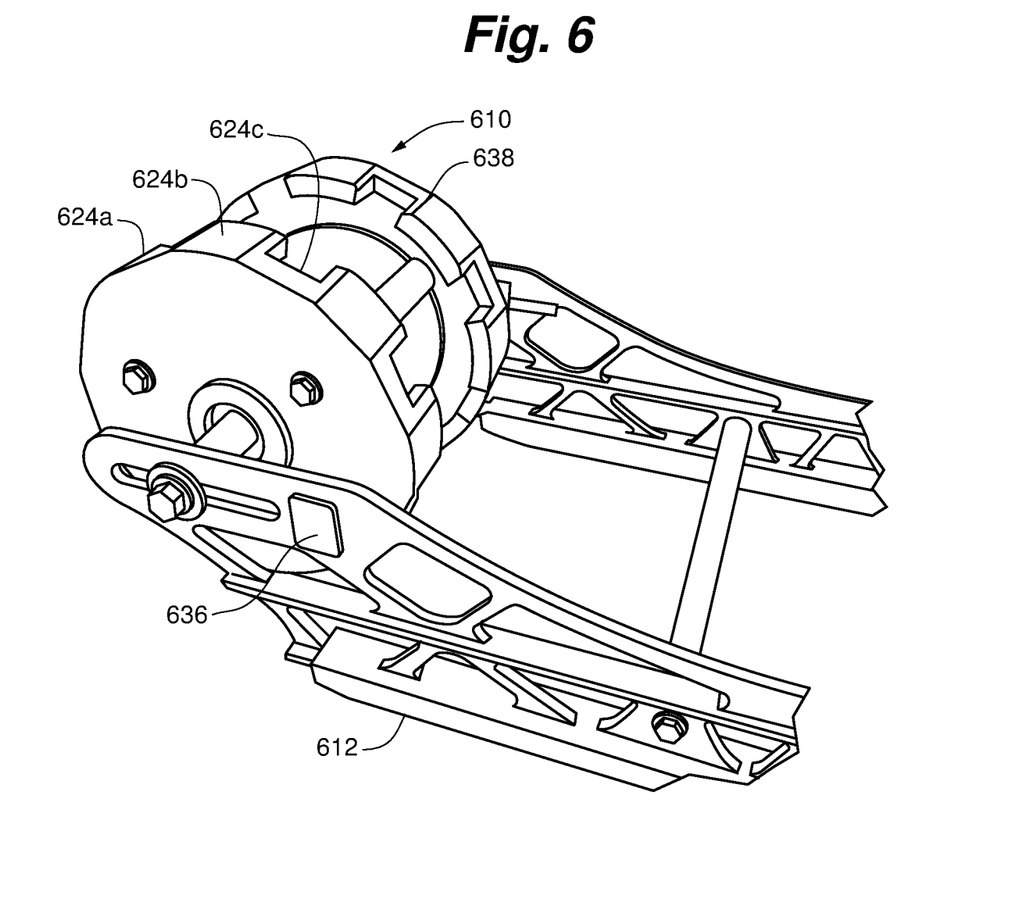
FIG. 6 is a rear wheel and slide rail according to an embodiment.

In alternative embodiments, a tensioning idler wheel assembly could include two, three, or more wheels. FIG. 4 depicts a 4-wheel configuration, for example, whereas FIG. 6 depicts a 2-wheel configuration. Depending on the configuration, any subset of the wheels can contain timing teeth (i.e., flats) to ensure the wheels stay in proper contact with the track to achieve maximum efficiency while reducing the chances of ratcheting.

A track (not shown in this Figure) can be routed about idler wheel 408 and along slide rail 412 to tensioning idler wheel assembly 404. As that track bends about tensioning idler wheel assembly 404, its non-round, angular profile can match that of the flats on tensioning idler wheel assembly 404. Engagement features on the radially inner side of the track can be used to position wheels by engaging timing roller 420. In this way, the track is fully supported along the flats defined by tensioning idler wheel assembly 404. Increased tension on the track, therefore, does not cause as much inelastic deformation over time, and ratcheting can be reduced without significantly affecting power output by dissipation in the belt or track.

Figure 5:
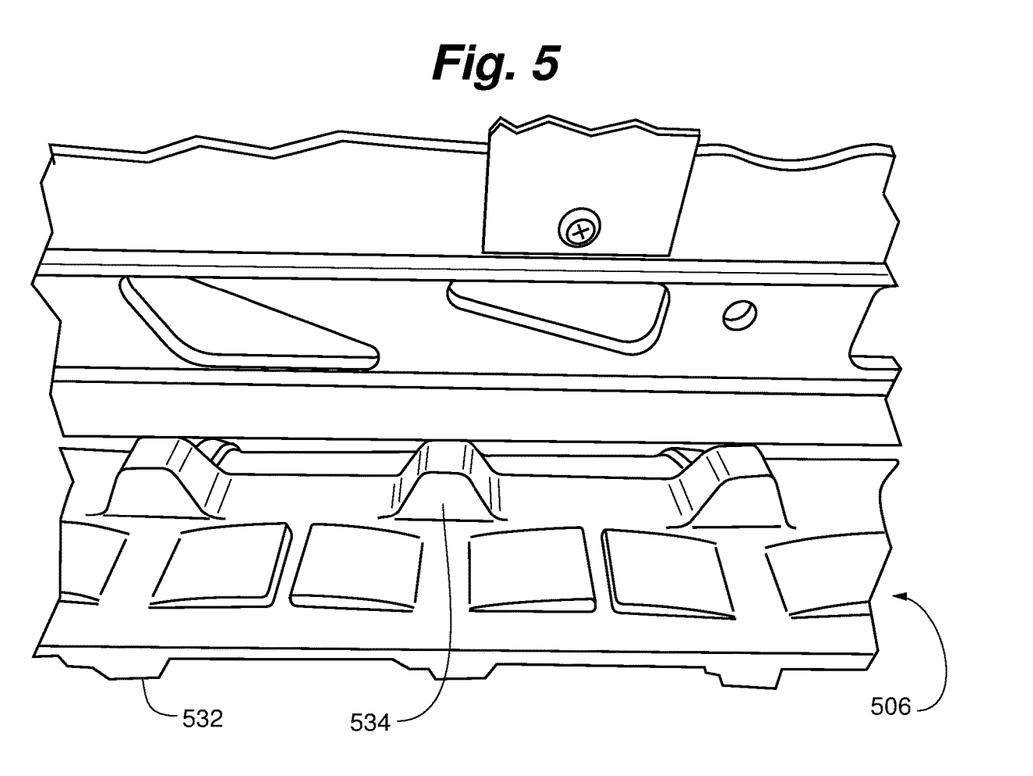
FIG. 5 is a track according to an embodiment.

FIG. 5 is a perspective view of a track 506 configured to engage with front wheels as described above (e.g., wheel assemblies 204, 404). In particular, track 506 includes lugs 532 and drive lugs 534. Lugs 532 are features that can increase the structural strength of track 506, and can be extended into features that provide grip on different types of terrain, such as fins, in embodiments. Drive lugs 534 are features that mechanically engage with a wheel, by fitting between drive teeth (e.g., drive teeth 220 or 420, or 330a or 330b, in the Figures above). In various embodiments, the spacing, size, or materials that make up lugs 532 and drive lugs 534 can vary to match the terrain or corresponding wheel components for mechanical engagement and driving, as desired.

FIG. 6 is a perspective view of a rear idler wheel 610 coupled to a slide rail 612. As shown in FIG. 6, rear idler wheel 610 includes several flats about its circumference, including flats 624a-624c. Such flats 624a-624c can provide support for a track passing around rear idler wheel 610, in embodiments. This support, as described with respect to embodiments of the front wheel above, can prevent ratcheting and increase power by permitting relatively higher levels of tension to be applied to a track without causing inelastic deformation of that track, for example.

Rear idler wheel 610 can be moved backwards and forwards with respect to slide rail 612 (i.e., relatively closer to or further from the front wheel, as shown in FIG. 1 above). This movement is accomplished using tensioner 636. By adjusting the position of rear idler wheel 610 along tensioner 636, the overall path length of a track circulating about slide rail 612 and back wheel 636, as well as idler or front wheels (not shown in this Figure), can be modified, which creates a corresponding change in the tension on that track.

In addition, in the embodiment shown in FIG. 6, rear idler wheel 610 includes a series of features 638 that can engage with the radially inner drive lugs of a track (e.g., drive lugs 534 of track 506, shown previously with respect to FIG. 5).

Figure 7:
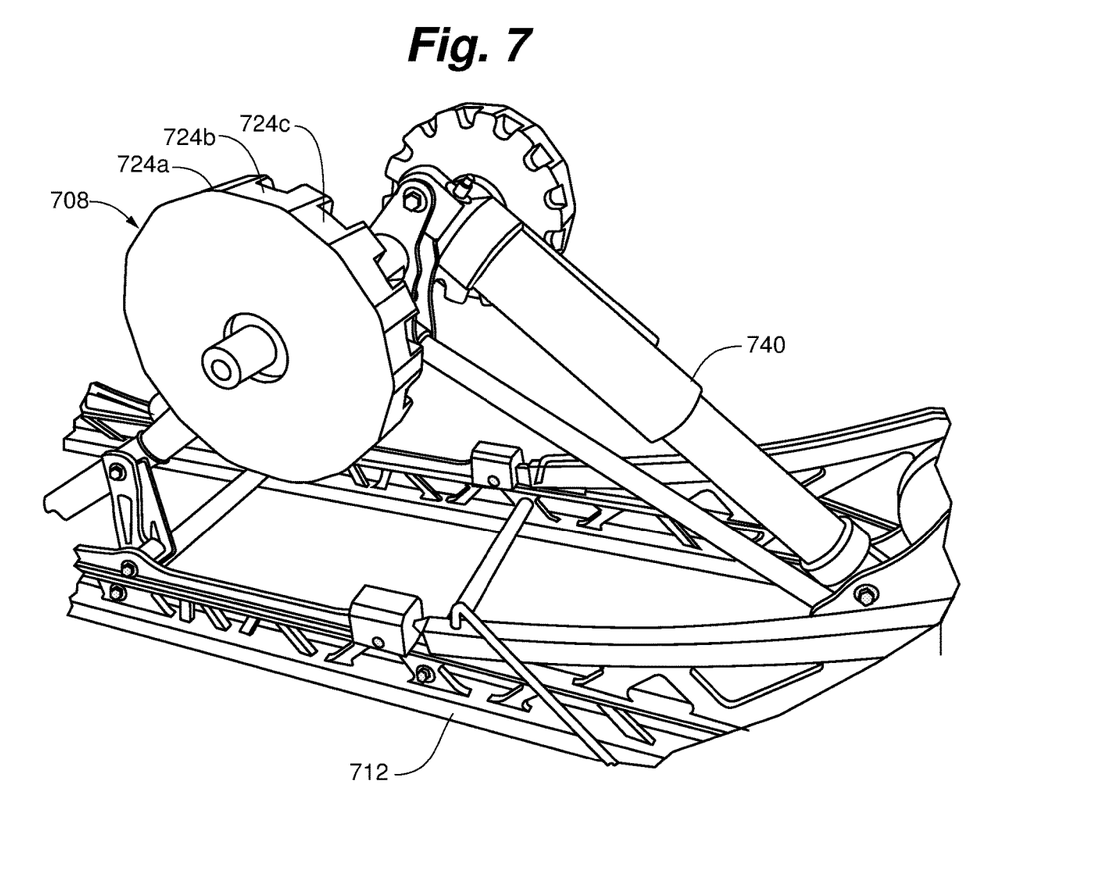
FIG. 7 is an idler wheel according to an embodiment.

FIG. 7 depicts an idler wheel 708, according to an embodiment. Like rear idler wheel 610 described above, idler wheel 708 includes a series of flats 724a-724c. Idler wheel 708 is not adjustable, in the embodiment shown in FIG. 7, although it is attached to slide rail 712 via shocks 740, providing some relative movement therebetween. In embodiments, a series of idler wheels can be provided about the route of a track to provide support and/or guidance. In embodiments, such idler wheels can be movable, adjustable, or immovable. In embodiments, some or all of such idler wheels can include flats to support a track that includes discontinuous bends as it moves. In some embodiments where an idler wheel is provided at a point where a track is not bending its course (e.g., along slide rail 712) a round idler wheel could be implemented, for example.

In combination, the driveshaft assembly, rear idler wheels, and idler wheels described above can provide support for a track as described above, which bends discontinuously about its route. These discontinuous bends are matched by flats provided on the wheels, so that a track can be driven and fully supported rather than attempting to bend about a perfectly rounded wheel, causing power losses. Furthermore, ratcheting can be reduced because the tension on a track can be increased without those corresponding power losses or inelastic deformation of the track at high tension.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A tracked vehicle comprising:
at least one drive wheel, an idler wheel, and a rear wheel;
the rear wheel disposed to the rear of the at least one drive wheel,
the rear wheel comprising a series of flat sections disposed about the circumference of the rear wheel and extending tangentially to the circumference,
wherein the flat sections include first and second segments of the flat sections that alternate throughout the circumference of the rear wheel defining the outer circumferential surface of the rear wheel, the first segment formed in a cantilever manner away from a disc of the wheel wherein the radial thickness of the first segment is defined entirely by an upper circumferentially extending wall and a lower circumferentially extending wall such that the upper wall has a first maximum circumferential length which remains substantially constant throughout an axial extension of the first segment away from the disc of the wheel and the lower wall has a second maximum circumferential length which remains substantially constant throughout the axial extension of the first segment, the second length being greater than the first length, the axial extension of the upper and lower walls are substantially equal and the axial extension of the first segment away from the disc of the wheel is greater than an axial extension of the second segment;
the tracked vehicle further including:
a track, wherein an overall path length of the track circulating around the rear wheel, the idler wheel and the at least one drive wheel may be modified by adjusting the position of the rear wheel therein adjusting the tension of the track.

2. The vehicle of claim 1, further comprising a slide rail.

* * * * *